United States Patent
De Vries (10) Patent No.: US 9,281,697 B2
(45) Date of Patent: Mar. 8, 2016

(54) CAPACITIVELY COUPLED CELL BALANCER WITH A COMMON AC BUS

(75) Inventor: Ian Douglas De Vries, Cape Town (ZA)

(73) Assignee: Balancell (Pty) Ltd, Cape Town (ZA)

( * ) Notice: Subject to any disclaimer, the term of this patent is extended or adjusted under 35 U.S.C. 154(b) by 175 days.

(21) Appl. No.: 14/125,558

(22) PCT Filed: Jun. 6, 2012

(86) PCT No.: PCT/ZA2012/000042
§ 371 (c)(1),
(2), (4) Date: Dec. 11, 2013

(87) PCT Pub. No.: WO2013/003869
PCT Pub. Date: Jan. 3, 2013

(65) Prior Publication Data
US 2014/0139184 A1    May 22, 2014

(30) Foreign Application Priority Data
Jun. 15, 2011 (ZA) .................................. 2011/04440

(51) Int. Cl.
*H02J 7/00* (2006.01)
(52) U.S. Cl.
CPC ............. *H02J 7/0019* (2013.01); *H02J 7/0016* (2013.01); *H02J 2007/0059* (2013.01)
(58) Field of Classification Search
CPC ............................. H02J 7/0016; H02J 7/0019
USPC ........................................................ 320/116
See application file for complete search history.

(56) References Cited

U.S. PATENT DOCUMENTS

2008/0211456 A1* 9/2008 Bolz et al. .................. 320/116
2009/0273321 A1* 11/2009 Gotzenberger et al. ....... 320/166

FOREIGN PATENT DOCUMENTS

| JP | 11-032443 A | 2/1999 |
| WO | WO 2011/036147 A2 | 3/2011 |
| WO | WO 2011036147 A2 * | 3/2011 |

OTHER PUBLICATIONS

International Search Report for PCT/ZA2012/000042, dated Oct. 15, 2012, 4 pages.
Written Opinion of the IPEA for PCT/ZA2012/000042, dated Sep. 23, 2013, 3 pages.

* cited by examiner

*Primary Examiner* — Samuel Berhanu
*Assistant Examiner* — Tessema Kebede
(74) *Attorney, Agent, or Firm* — Klarquist Sparkman, LLP

(57) ABSTRACT

This invention concerns a capacitively coupled cell balancer with a common AC bus. It comprises either a half or full bridge connected to each cell of a set of N cells, which are either floating or connected in series. The midpoints of each half bridge and the full bridges are coupled through coupling capacitors to a common AC bus.

6 Claims, 6 Drawing Sheets

Half bridge per cell with return capacitor

A practical layout configuration

Figure 1. Half bridge per cell with return capacitor

Figure 2. Current into a cell (x) and it's coupling capacitors for a half bridgep per cell Figure 3. Half bridge per cell without return capacitor Figure 4. Full bridge per cell Figure 5. Current into a cell (x) and it's coupling capacitors for a full bridge per cell Figure 6. Equivalent Balancing circuit Figure 7. A practical layout configuration

US 9,281,697 B2

CAPACITIVELY COUPLED CELL BALANCER WITH A COMMON AC BUS

CROSS REFERENCE TO RELATED APPLICATIONS

This is the U.S. National Stage of International Application No. PCT/ZA2012/000042, filed Jun. 6, 2012, which was published in English under PCT Article 21(2), which in turn claims the benefit of South Africa Application No. 2011/04440, filed Jun. 15, 2011.

REFERENCES

1. Pascual, Cesar and Krein, Philip. Switched Capacitor System for Automatic Battery Equalization. U.S. Pat. No. 5,710,504, Jan. 20, 1998.
2. Schmidt, Heribert. Apparatus for Charge exchange among a plurality of series connected Energy accumulators or Energy converters. U.S. Pat. No. 5,814,970, September, 1998
3. Lundquist, David. System and method to facilitate voltage balancing in a multi-cell battery. U.S. Pat. No. 6,624,612, September, 2003.
4. Marten, Victor. Charge Balancing system. U.S. Pat. No. 6,518,725, Feb. 11, 2003.
5. Castelaz, Jim et al, System and method for balancing charge within a battery pack. U.S. Pat. No. 6,624,612, September, 2010.
6. Patel, Sanjay et al. Cell Equalizing Circuit. U.S. Pat. No. 7,061,207 Feb. 11, 2006

BACKGROUND

There are many methods of active balancing series stacked battery cells or super capacitors. Of these methods there is a sub group often described as switched capacitor balancing. There are two well known methods that use switched capacitor type balancing, the first of which is used by Pascual [1], Schmidt [2], Lundquist [3] and others. This method essentially has capacitors that are alternately connected across two adjacent cells using a set of switches. The charge is shuffled via the capacitor from one cell to the adjacent cell. The problem with this system is that if charge has to be transferred from a high State Of Charge (SOC) cell to a low SOC cell that are separated by one or more cells from each other, then the charge has to be shuffled through every cell in between them. This means the charge must flow through all the cell switches and capacitors in between the high SOC cell and low SOC cell. For the current to flow from one cell to the next, there must be a voltage difference between them. If this current has to flow through a number of cells, then this voltage difference will be multiplied by the number of cells it has to flow through. For example, if 100 mV is required to obtain 1 A of current flow between two cells, then if 1 A was required to flow from cells that were spaced 10 cells apart in a stack, there would have to be 100 mV drop between each cell, giving a total of a 1V drop over the ten cells. Hence during the balancing, there will be voltage gradients across cells which is not ideal. This voltage gradient will appear across cells between a high SOC cell and a low SOC cell, in effect unbalancing all the cells in between these two cells which is also not ideal. The voltage gradient will considerably reduce the amount of balancing current that can flow between widely spaced cells. In addition, every time the energy is shuffled from one cell to its adjacent cell, there is some energy loss and hence shuffling charge through all interconnecting cells increases energy losses. However, an advantage of this system is the switches only have to be rated at the cell voltage and are only switching with one cell's voltage across them.

The second method of switched capacitor balancing attempts to address some of these limitations and is used by Marten [4], Castelaz [5] and others. This method essentially enables a single capacitor to be attached to any cell with a bank of switches. For example, the capacitor could first be attached to a high SOC cell and then directly to a low SOC cell. A disadvantage of this system is the switches must be rated at the full battery pack voltage. In addition, the system will incur fairly high switching losses as there will be on average quite a high voltage across the switches e.g. in the case where it is balancing the top and bottom cell, the switches will be switching with the full pack's voltage across them. If the capacitor is connected cyclically between all capacitors, its balancing rate is considerably lower than the first switched capacitor method (in order of 1/n, where n=number of cells, less than first method). The balancing speed can be increased significantly by making intelligent decisions about which cell to connect the capacitor to, but requires cell voltage monitoring and computing ability.

SUMMARY OF INVENTION

This invention comprises either a half or full bridge connected to each cell of a set of N cells that are either floating or connected in series. The midpoint of each half bridge and midpoints of the full bridge are then each coupled through coupling capacitors to a common AC bus.

The half bridge has a coupling capacitor from its midpoint to the first rail of the common AC bus and requires a return capacitor connected from the negative terminal of each cell to the second rail of a common AC bus. All the high side switches of each half bridge connected to each cell should be switched on and off synchronously by a common high side control signal. All the low side switches of each half bridge connected to each cell should be switched on and off synchronously by a common low side control signal. The high and low side control signals should be in anti-phase to each other with approximately 50% duty cycle.

The full bridge has its two midpoints coupled through two coupling capacitors to the two rails of the common AC bus. All the high side switches of the first leg of every full bridge and all the low side switches of the second leg of every full bridge should be switched on and off synchronously by a common leg one control signal. All the low side switches of the first leg of every full bridge and all the high side switches of the second leg of every full bridge should be switched on and off synchronously by a common leg two control signal. The leg one and leg two control signals should be in anti-phase to each other with approximately 50% duty cycle.

BRIEF DESCRIPTION OF DRAWINGS

The invention will now be described in more detail, by way of example only, with reference to the accompanying drawings listed.

DETAILED DESCRIPTION OF INVENTION

Half Bridge Per Cell

Figure 1:
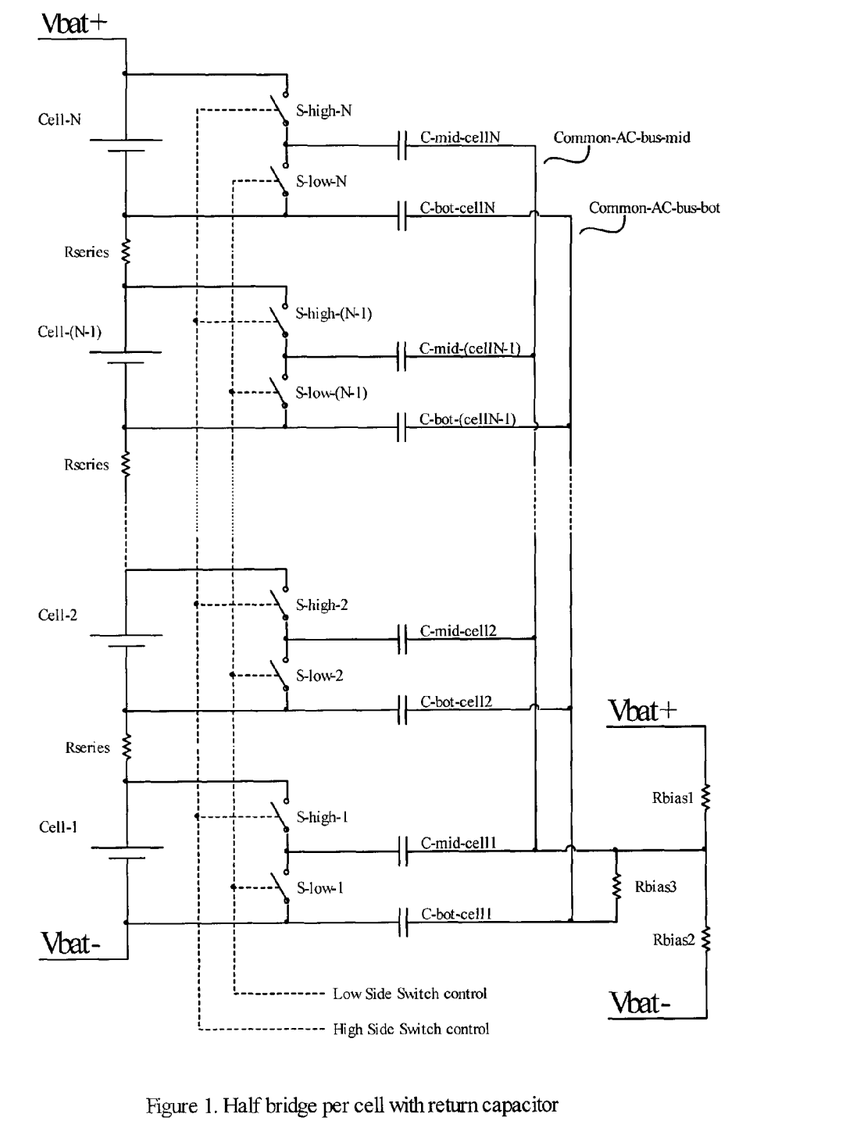
FIG. 1. Half bridge per cell with return capacitor
FIG. 2. Current waveforms for a half bridge
FIG. 3. Half bridge per cell without return capacitor
FIG. 4. Full bridge per cell
FIG. 5. Current Waveforms for a full bridge
FIG. 6. Equivalent balancing circuit
FIG. 7. A practical layout configuration

The circuit shown in FIG. 1 has two switches connected in a half bridge across each cell. These switches are labelled S-low-1 and S-high-1 for Cell 1, all the way to S-low-N and S-high-N for cell N. The low side switches S-low-(1 to N) should all be switched synchronously on and off at the same time by the Low Side Switch control signal. The high side switches S-high-(1 to N) should all be switched synchronously on and off at the same time by the High Side Switch control signal. The high and low side switches should be switched on and off in anti-phase with approximately 50% duty cycle i.e. the low side switches should be on for approximately 50% of time while high side switches are off and vice versa. The duty cycle does not need to be exactly 50%, but a large deviation from this will reduce the performance of the circuit. In practise to reduce the cross conduction losses, there may also be a small dead time during the switching transitions when both switches are off. The switches are all turned on and off at a rate termed the switching frequency.

The circuit operation can be understood by realising that the switching half bridge effectively turns the cell DC voltage into a square wave AC voltage that has the same peak to peak magnitude as the cell DC voltage. The AC voltage is also synchronous with all the other AC voltages produced by other cells. This AC voltage is then coupled into a common AC bus comprising Common-AC-bus-mid and Common-AC-bus-bot via the coupling capacitors C-mid-cell-x and C-bot-cell-x (for cell x). The AC peak to peak bus voltage will adopt a value that is approximately equal to the average DC voltage of all the cells connected to it. The half bridge acts to convert DC into AC, but will also convert the AC at its midpoint back into DC provided the AC waveform is synchronous with its own switching cycle. As all the cells half bridge's are switching synchronously, the AC voltage will be synchronous and the half bridge will support bidirectional current flow into or out of the Cell from the common AC bus. If a cell's DC voltage is higher/lower than the average of the cells, then it's AC voltage will also be higher/lower than AC bus voltage. Hence current will flow out of the higher cell or into the common AC bus or into the lower cell out of the common AC bus.

Advantages of this circuit's operation are
1. Current flows directly from a higher cell to the lower cell via the common AC bus, without flowing through any of the cells interconnected between them.
2. If only one cell is higher than the rest, then current will flow out of this cell into the AC bus and then distribute evenly over the rest of the cells with an equal amount of current flowing into each of them.
3. If only one cell is lower than the rest, than an equal amount of current will flow evenly out of all other higher cells into the AC bus and then these currents will combine to all flow into this lower cell.
4. If a cell is balanced, then no current will flow into or out of it.
5. If all the cells are balanced then there is no current flow in the balancing circuit, or any current in the cells.

Another advantage of this system is that the switches in either a half or full bridge configuration only have to be rated at the cell voltage. They are also only switching with one cell's voltage across them, which helps to minimize switching losses and EMI.

The Rseries resistance in between cells shown in FIG. 1 is mostly the cell to cell interconnection resistance. If we assume that Rseries is much larger than the impedance of the return coupling capacitors C-bot-cell-(1 to N), then the circuit operation would be identical whether the cells were floating or whether they were connected in series with a large interconnection impedance.

Figure 6:
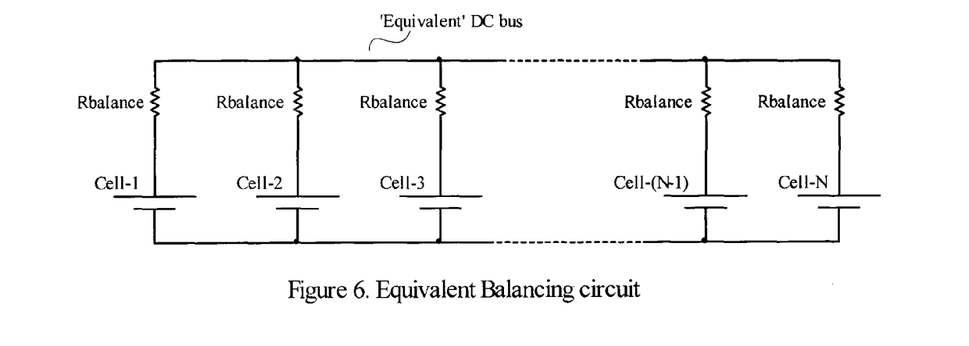

The operation of the circuit may also be understood by realizing that the current flow between any two cells will be a linear function of the voltage difference between them. Hence we could model the current flow between two cells as if they had their negative terminals connected together with a resistance between the positive terminals. This resistance is termed the effective balancing resistance. If the same circuit is modelled between all the cells than the complete resultant circuit is shown in FIG. 6 and is termed the equivalent balancing circuit. The effective balancing resistance is shown as $R_{balance}$ in FIG. 6. For a half bridge per cell circuit, the minimum value of this resistance could possibly be is an addition of all the impedances the current has to flow through to charge a cell. From figure one it can be seen that the current first has to flow through C-mid-x, S-high-x and C-bot-x to charge a cell-x, and then an equal amount of charge must flow back through then C-bot-x, S-low-x and C-mid-x. Hence an addition of all these gives $[jX_c \text{(C-mid-x)}+R_{on} \text{(S-high-x)}+jX_c \text{(C-bot-x)}+jX_c \text{(C-bot-x)}+R_{on} \text{(S-low-x)}+jX_c \text{(C-mid-x)}]$ Where $X_c$ is impedance of the capacitor at the switching frequency, f. (This is a simplification as it is only the impedance of the capacitor at the fundamental of the square wave switching waveform). If we assume that resistance of both the high and low side switches is equal to $R_{on}$ and that C-mid and C-bot are equal to $C_{couple}$ then this reduces to the following $$\text{Total Series impendance is then} = 2 \cdot R_{on} + 4 \cdot \frac{j}{2 \cdot \pi \cdot f \cdot C_{couple}}$$

$$\text{The magnitude of this equals} = \sqrt{4 \cdot R_{on}^2 + 16 \cdot \left(\frac{1}{2 \cdot \pi \cdot f \cdot C_{couple}}\right)^2}$$

However, since the actual current only flows for half the time, this equates to effectively doubling this resistance. Hence the minimum value that the effective balancing resistance can be for a half bridge is given by the following equation $$R_{balance} \cong 2 \cdot \sqrt{4 \cdot R_{on}^2 + 16 \cdot \left(\frac{1}{2 \cdot \pi \cdot f \cdot C_{couple}}\right)^2}$$

This is a simplification but it is useful design guideline and can be used in equivalent balancing circuit of FIG. 6. In fact simulation shows the true value to be roughly only 10% higher than this calculated value. It can be seen that the point where the resistive and capacitive impedances have the same contribution is when $X_c$ is ½ of $R_{on}$. This gives a very good starting design point. Practical circuits will have losses as well, which will manifest as increased current draws on cells and lower balancing currents.

The efficiency of the system is similar to a switched capacitor converter, and has a maximum theoretical value between any two cells of $(V_{cell-in}/V_{cell-out})$, where $V_{cell-out}$ is the voltage of the cell that energy is coming from, and $V_{cell-in}$ is the voltage of the cell that the energy is going to.

The coupling capacitors C-mid-cell (1 to N), C-bot-cell (1 to N), C1-cell (1 to N), C2-cell (1 to N) should have a value as high as possible to lower the impedance of the capacitor and hence lower effective balancing resistance between cells.

However, increasing capacitor values corresponds to increasing size and cost. Thus there will be a trade off between capacitor size and cost versus circuit performance. Increasing the switching frequency will also decrease the capacitor impedance, allowing smaller capacitor values. However, increasing switching frequency will also increase switching losses and this again will be a trade off between capacitor size and cost, circuit performance and switching losses. The coupling capacitors should also have an value equal to its counter part on another cell i.e. C-mid-cell (1 to N) should be of equal value, C-bot-cell (1 to N) should be of equal value, C1-cell (1 to N) and C2-cell (1 to N) should be both be of equal value. As a rough design guideline the impedance of the capacitors at the switching frequency should be less than the on resistances of the switches. A disadvantage of decreasing the capacitor impedance is that the short circuit current will increase. Converse to this, this system also lends itself to a method of providing short circuit protection, by reducing the switching frequency and thereby increasing the impedance of the capacitors and reducing the current.

The minimum voltage that the top and bottom cell's coupling capacitors can be rated at is half the total battery pack voltage. This is obtained when both the common AC buses are biased at the midpoint of the total battery pack voltage, relative to the negative terminal of the battery. Hence the capacitors at the top of the stack and bottom of the stack will have half the total battery pack DC voltage across them. The voltage across the rest of the coupling capacitors will decrease with cells that are closer to the center of the pack. The center cell or center two cells will have the least DC voltage across them (either zero or one cell's voltage).

Figure 2:
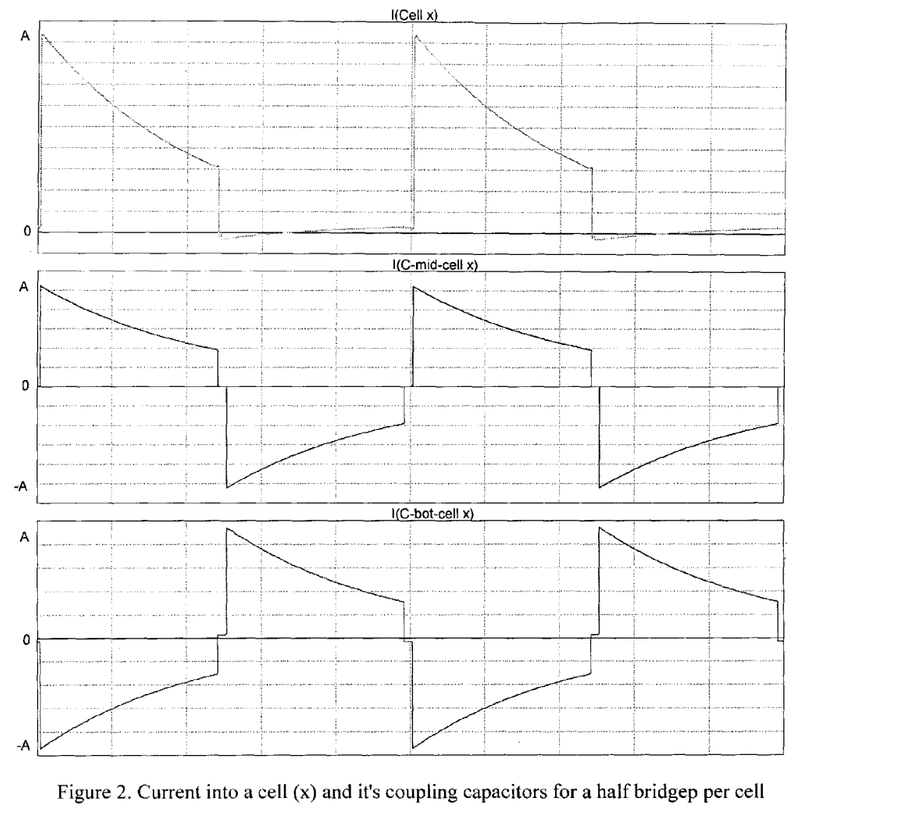

For the circuit of FIG. 1 (half bridge per cell), the current waveforms can be seen in FIG. 2. The first plot shows current into the Cell-x, the second plot shows current in the midpoint coupling capacitor (C-mid-cell x), and the third plot shows the current in the bottom coupling capacitor (C-bot-cell x).

This system will work equally well on any cell chemistry type or super capacitors. The cells or capacitors also do not need to be connected in series, as the system will equalize floating cells or capacitors just as well. Therefore this system can be used to provide identical floating voltage sources that can be used to calibrate other systems, such as difference amplifiers, or cell voltage measurement circuits. However, the coupling capacitors should then be rated at the biggest voltage difference referenced to a common point between any two cells.

Figure 3:
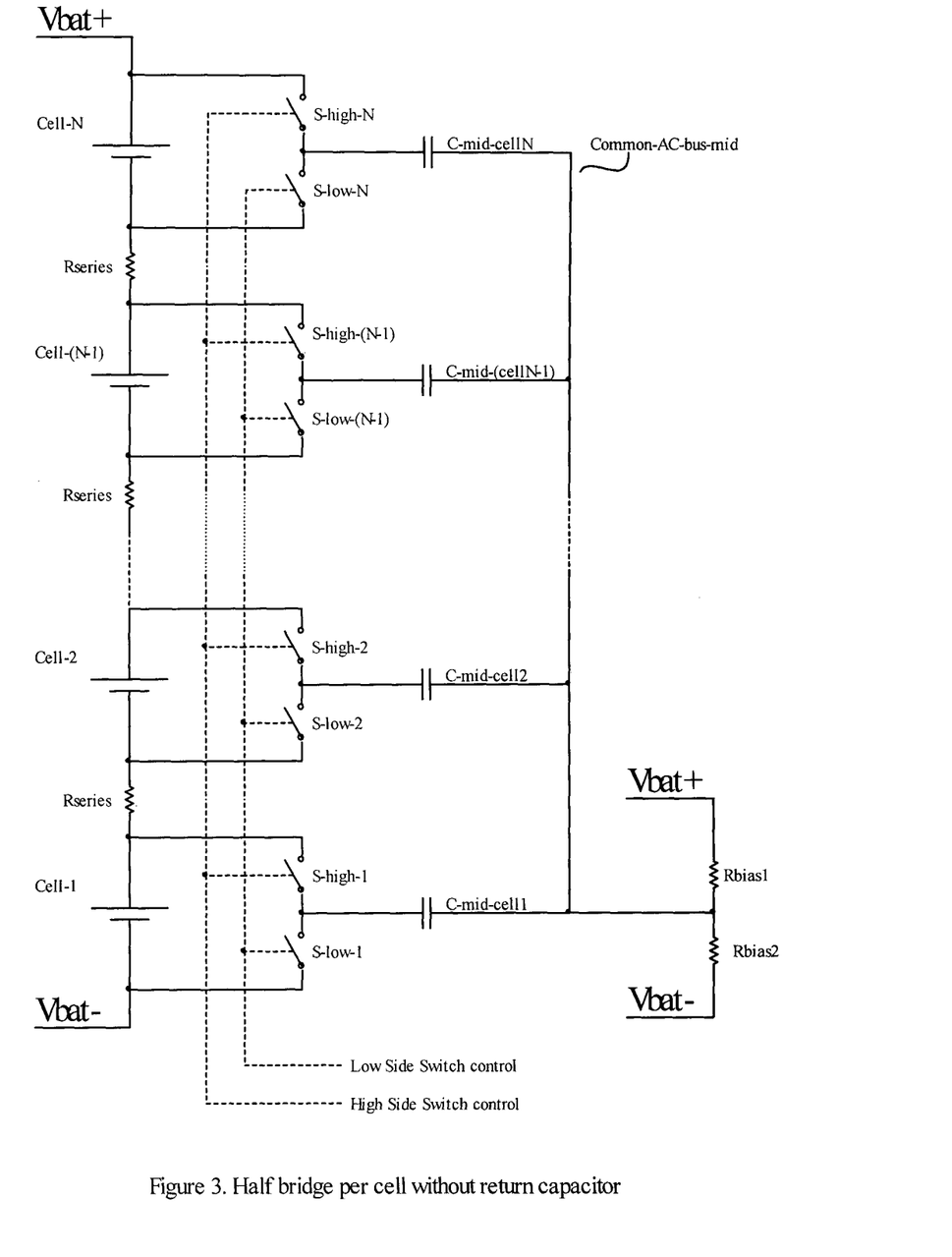

If the series resistance, Rseries, shown between the cells when connected in series is low enough, some of the balancing current will flow through interconnecting cells as opposed to through the bottom coupling capacitance, C-not-cell-x. If the series resistance between cells is really low it may be tempting to leave out the bottom return capacitor completely as shown in FIG. 3. This circuit will work and eventually balance the cells. However, if Rseries is not relatively much lower than other balancing circuit impedances (usually Rseries needs to be less than 1 milliohm), than the balancing current flowing into or out of cells will not be evenly distributed. Thus it will lead to un-equal balancing rates for different cells. In addition the interconnecting cells between a high and low cell for example, will now carry the AC current between these two cells. Hence it is preferable to add a return bottom coupling capacitor even if the series resistance is low.

Full Bridge Per Cell

Figure 4:
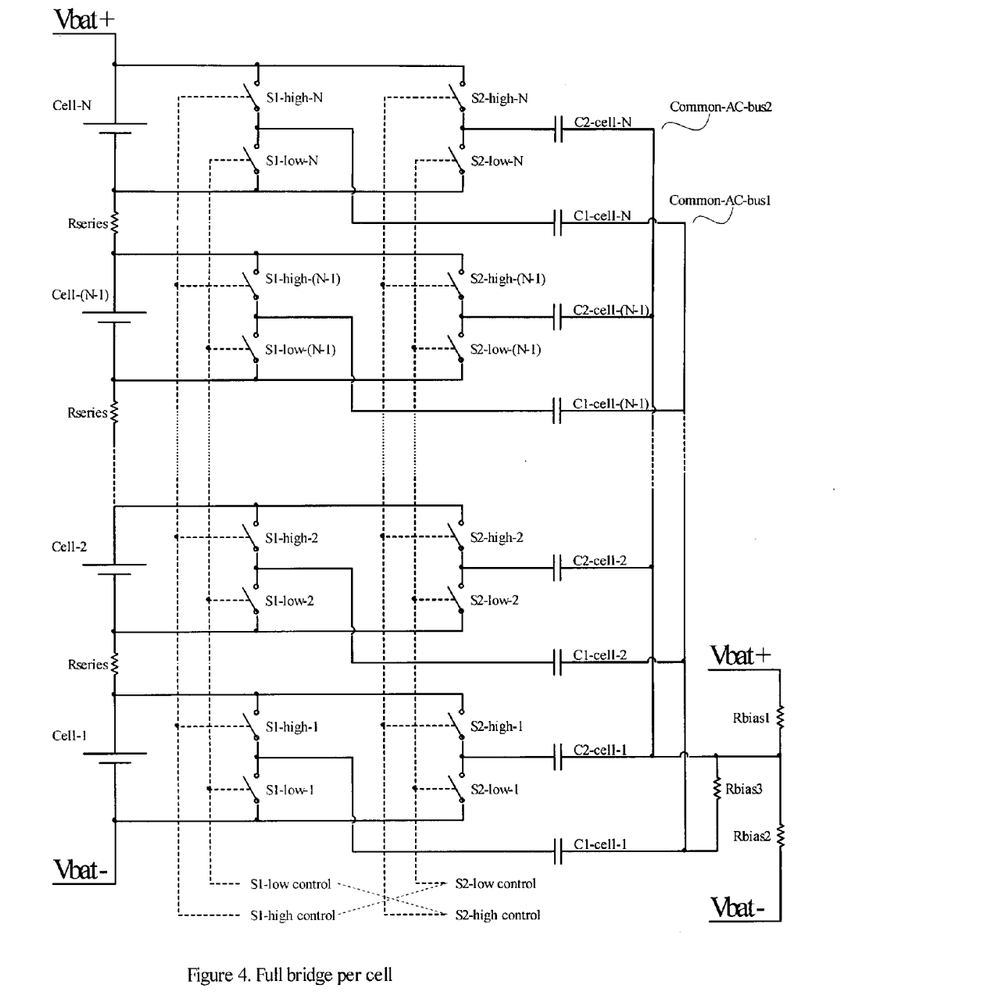

A full bridge per cell configuration as shown in FIG. 4 improves upon a half bridge in that it more than doubles the balancing current, but still only uses two coupling capacitors as it does not need a return capacitor. The operation of the full bridge requires that all the low side switches of the first bridge S1-low-(1 to N) should all be switched on synchronously by the S1-Low control signal, and at the same time all of the high side switches of the second bridge S2-high-(1 to N) should be switched on by the S2-high control. The high side switches S1-high-(1 to N) of the first bridge should all be switched synchronously on by the S1-high control signal and at the same time all the low side switches of the second bridge S2-low-(1 to N) should be switched on by the S2-low control signal. This means S1-low control signal and S2-high control signal are in phase, and S1-high control signal and S2-low control signal are in phase. The respective low and high control signals should be in anti-phase to each other with approximately 50% duty cycle and a small dead time.

The AC voltage across the coupling capacitors now swings both positive and negative around it's offset bias point. This is twice the swing that would occur in a half bridge per cell system, hence effectively reducing the capacitor impedance and increasing the balancing current as well. Another advantage of a full bridge is that the AC voltage across the capacitors swings both positive and negative around it's offset bias point, and a return current that is both equal and opposite will flow in the second AC bus. Hence even if the series resistance (Rseries) is low, no AC current will flow through the interconnecting cells. A big advantage of this fact is that all the balancing current will be in the ground lead of the full bridge, which then lends itself to current sensing.

The full bridge also has slightly less than half the effective balancing resistance of a half bridge. Using the same approach as the half bridge, addition of all the series impedances gives

[jX$_c$(C2-cell-x)+R$_{on}$(S-high-x)+R$_{on}$(S-low-x)+jX$_c$(C1-cell-x)]

Where R$_{on}$ is the on resistance of the switch and X$_c$ is impedance of the capacitor at the switching frequency, f. (Again this is a simplification as it is only the impedance of the capacitor at the fundamental of the square wave switching waveform). If we assume that resistance of the high and low side switches of both bridges is equal to R$_{on}$ and that C1-cellx and C2-cellx are equal to C$_{couple}$ then this reduces to the following $$\text{Total Series impendance is then} = 2 \cdot R_{on} + 2 \cdot \frac{j}{2 \cdot \pi \cdot f \cdot C_{couple}}$$

$$\text{The magnitude of this equals} = \sqrt{4 \cdot R_{on}^2 + 2 \cdot \left(\frac{1}{2 \cdot \pi \cdot f \cdot C_{couple}}\right)^2}$$

However, unlike the half bridge, the actual current flows all the time, so this resistance does not need to be doubled. Hence the minimum value that the effective balancing resistance can be for a full bridge is given by the following equation $$R_{balance} \cong 2 \cdot \sqrt{4 \cdot R_{on}^2 + 4 \cdot \left(\frac{1}{2 \cdot \pi \cdot f \cdot C_{couple}}\right)^2}$$

Again this is a simplification but it is a useful design guideline and this resistance value can be used in equivalent balancing circuit of FIG. 6. In fact simulation shows the true value for R$_{balance}$ to be roughly only 6% higher than this calculated value for a full bridge configuration. It can be seen that the point where the resistive and capacitive impedances have the same contribution is when X$_c$ is equal to R$_{on}$, which again gives a very good starting design point. Actual capacitor selection involves many trade offs as discussed previously. The equivalent balancing circuit of FIG. 6 is also useful to provide a quick calculation of balancing currents that will flow. It also illustrates that this balancing circuit and method will make current flow evenly into (or out of) cells only where it is needed and the balancing current distribution will be spread out evenly across all relevant cells. This type of operation is close to ideal for a linear system working on cell terminal voltages.

Figure 5:
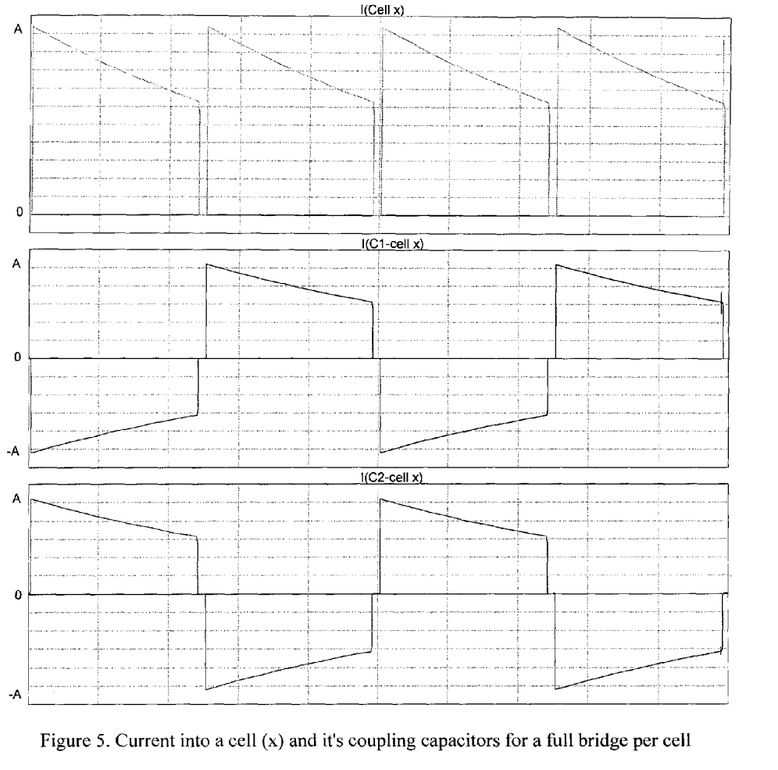

The efficiency of a full bridge system will be the same as a half bridge. The last advantage to mention of a full bridge is that the balancing current into or out of a cell will be more uniform. This difference can be seen between FIG. 2 and FIG. 5. The current into the cell for a half bridge configuration shown in the first plot of FIG. 2 is seen to be a single trapezoidal like pulse for half a period. The current into the cell for a full bridge configuration shown in the first plot of FIG. 5 is seen to be a double trapezoidal like pulse adjacent to each other. Hence the current into the cell for a full bridge is more uniform, has a lower RMS to average ratio and will need less filtering.

A advantage of a full bridge per cell is that the current to or from a cell in the AC bus1 will be opposite to that of the current in AC bus2. Hence AC bus1 and AC bus 2 can be treated as a pair (or transmission line) with one providing the return path to the other.

To summarize the circuit; energy can be transferred directly any two cells or distributed evenly to all the cells that need them; the circuit does not need any calibration and provided the physical characteristics of the switches are matched then the circuit naturally has a very low offset between all the cell voltages; the switches on each cell only need to be rated at the cell voltage; the switches are only switching with one cell's voltage across them; the coupling capacitors only need to be rated to half of the battery pack voltage; there is no energy exchange or current flow in cells that are already balanced, and once all cells are balanced then the current draw is reduced to the operating quiescent current.
Practical Implementation and Considerations Practically implementing this circuit has some additional peculiarities that must be accounted and designed for especially with six or more cells in series. If the AC bus is a simple long straight track, then since it is operating at a fairly high frequency (e.g. 1 MHz) and very low impedance (milliohms), it will start to behave like a transmission line, and have some form of ringing or standing waves on it. As it is a multi drop line with each cell connecting at different points, this ringing can cause the quiescent (or steady state) cell voltages to deviate by a few mV from each other i.e. there will be some offsets between the cell voltages. The AC impedance between any two cells is also not the same.

Figure 7:
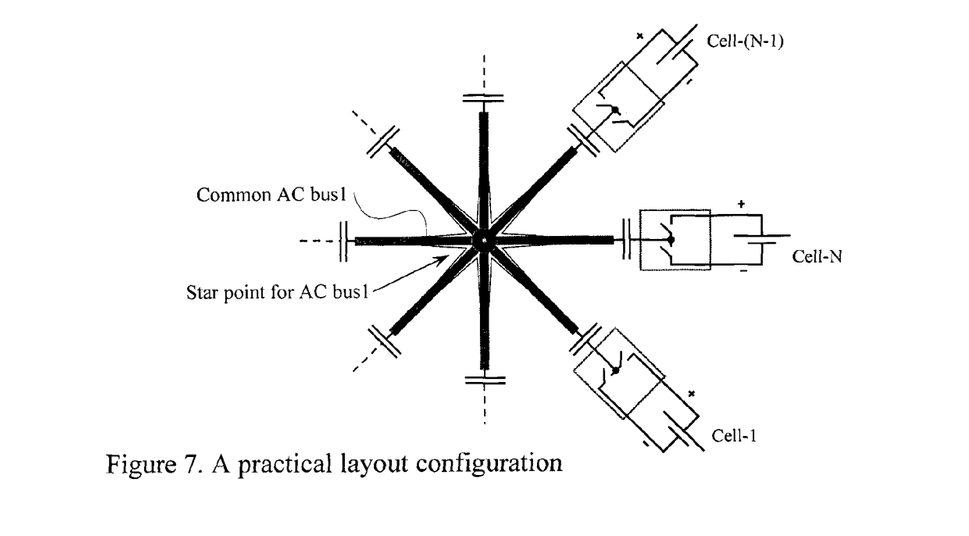

The first partial solution to this is to have a AC bus connected in a circular loop, with all the cell full bridges evenly spaced around this circular loop. This will improve on a simple long straight AC bus system but it is still not ideal. The ideal solution that solves the problem is to have a AC bus that is star connected. Each cell's bridge and its connections are arranged again in a circular fashion, however, the AC bus from each cell is now sent on individual tracks (transmission line) towards the center of the circular arrangement, and here all the AC bus tracks are connected together at a single point, termed the star point. This means that AC bus distance (and AC impedance) between any two cells is now identical. This layout is shown in FIG. 7 for a single AC bus. For the full bridge per cell with two AC buses, the second AC bus should have the same layout and run underneath the first AC bus. As discussed earlier the current in the AC buses is opposite and they provide return paths for each other.

Having the cell switching bridges arranged in a circular fashion around a center point, also allows us to distribute the gate drive signals evenly, by starting at the center point (or as close as possible to it) and then distributing it with individual fan out tracks to each cells switching bridge. This means the delay and impedance to each cells bridges gates is now equal, and hence all the MOSFETs should switch on synchronously, which will help reduce the offset voltages between cells, and maintain equal quiescent operating currents.

The quiescent power loss in this circuit is mainly due to capacitive switching losses of each half bridge. The output capacitances of each bridge is predominately due to the MOSFETs capacitances. There is very little loss due to switching load currents (resistive type switching losses), since in this topology as soon as the output voltage changes a little the load current is reduced to zero.

Assuming the half-bridges are driven with a 50% duty c\cycle, then the capacitive switching losses can be reduced partially or completely (to zero voltage switching (ZVS) condition) by the addition of a SINGLE inductor between the two AC common busses for ALL of the cells. The single inductor should ideally be connected at the common star point of both the common AC bus1 and AC bus2, at the center of the circular arrangement. The common star point is on the 'common side' of all the coupling capacitors to each cell's bridge. The voltage across the inductor will then be a symmetrical square wave of (Vcell/2--Vcell/2=Vcell amplitude, or 2 Vcell peak to peak). The current through the inductor will then be a symmetrical triangular waveform, with a zero average value. Provided there is a small dead time between switching off and on of the respective opposite switch, the inductor current will drive the voltage on both sides of the bridge towards the opposite rail. With selection of a suitable value inductor and dead time, based on the cell voltage, the total bridges output capacitance and the switching frequency, complete ZVS can be achieved on all bridges. However, this practically is not necessarily the most effective solution, as there is a trade off between inductor size, inductor losses, current losses and inductor cost. Hence optimum overall system efficiency and effectiveness may be gained by partially reducing the capacitive losses. Reducing the capacitive switching losses effectively means reducing the switching voltage and has added benefit of reducing the EMI of the circuit.

Although the invention has been described above with reference to preferred embodiments and examples, it will be appreciated that many modifications or variations of the invention are possible without departing from the spirit or scope of the invention.

What is claimed is:

1. A circuit for balancing 2 or more cells or capacitors connected in series or floating, said circuit comprising:
    N cells connected in series or floating;
    a common AC bus comprising a first and second rail;
    a first half bridge connected to said first cell's positive and negative terminals;
    a second half bridge also connected to said first cell's positive and negative terminals;
    said first and second half bridges together comprising a full bridge connected across said first cell;
    said first half bridge comprising a bridge one high side switch and a bridge one low side switch;
    said second half bridge comprising a bridge two high side switch and a bridge two low side switch;

a first bridge one coupling capacitor connected with its first end to the midpoint of said first half bridge and with its second end connected to the first rail of said common AC bus;

a first bridge two coupling capacitor connected with its first end to the midpoint of said second half bridge and with its second end connected to the second rail of said common AC bus;

said first half bridge, first bridge one low side switch, first bridge one high side switch, first bridge one coupling capacitor, repeated N times for N cells, and all connected in an identical manner across each respective cell as described for said first cell;

all second ends of said 1 to N bridge one coupling capacitors connected to the first rail of said common ac bus;

said second half bridge, first bridge two low side switch, first bridge two high side switch, first bridge two coupling capacitor, repeated N times for N cells, and all connected in an identical manner across each respective cell as described for said first cell;

all second ends of said 1 to N bridge two coupling capacitors connected to the second rail of said common ac bus;

all said 1 to N bridge one low side switches driven synchronously on and off by a common bridge one low side control signal;

all said 1 to N bridge one high side switches driven synchronously on and off by a common bridge one high side control signal;

all said 1 to N bridge two low side switches driven synchronously on and off by a common bridge two low side control signal;

all said 1 to N bridge two high side switches driven synchronously on and off by a common bridge two high side control signal;

said bridge one low side and said bridge one high side control signal being anti-phase with an AC duty cycle;

said bridge two low side and said bridge two high side control signal being anti-phase with an AC duty cycle;

said bridge one low side control signal and said bridge two high side control signal being in phase and switching synchronously;

said bridge one high side control signal and said bridge two low side control signal being in phase and switching synchronously;

wherein each cell's full bridge is constructed in such manner that said N full bridges are arranged, spaced apart in a ring around a central star point;

each cell having its own individual track for two AC buses, running towards the center of the circular arrangement;

all said individual cell's first AC bus tracks connected together at common star point, at the center of the circular arrangement; and all said individual cell's second AC bus tracks connected together at common star point, at the center of the circular arrangement, spatially above or below said first AC bus star point.

2. The circuit as claimed in claim 1, wherein a single inductor is connected between the two AC buses, on the common side of the coupling capacitors.

3. The circuit as claimed in claim 1, wherein said bridge one low side and said bridge one high side control signal have a duty cycle of 30% to 70%.

4. The circuit as claimed in claim 3, wherein said bridge one low side and said bridge one high side control signal have a duty cycle of 40% to 60%.

5. The circuit as claimed in claim 1, wherein said bridge two low side and said bridge two high side control signal have a duty cycle of 30% to 70%.

6. The circuit as claimed in claim 5, wherein said bridge two low side and said bridge two high side control signal have a duty cycle of 40% to 60%.

* * * * *